(12) United States Patent
Edwards

(10) Patent No.: US 8,125,374 B2
(45) Date of Patent: Feb. 28, 2012

(54) METHOD OF PREVENTING FALSE DETECTIONS IN SENSORS

(75) Inventor: Philip Trevelyan Edwards, Newport (GB)

(73) Assignee: BAE Systems PLC, London (GB)

( * ) Notice: Subject to any disclaimer, the term of this patent is extended or adjusted under 35 U.S.C. 154(b) by 518 days.

(21) Appl. No.: 12/295,961

(22) PCT Filed: Aug. 5, 2008

(86) PCT No.: PCT/GB2008/050663
§ 371 (c)(1),
(2), (4) Date: Oct. 3, 2008

(87) PCT Pub. No.: WO2009/027718
PCT Pub. Date: Mar. 5, 2009

(65) Prior Publication Data
US 2010/0158152 A1    Jun. 24, 2010

(30) Foreign Application Priority Data

Aug. 31, 2007   (EP) .................................. 07253452
Aug. 31, 2007   (GB) .................................. 0716967.5

(51) Int. Cl.
*G01S 13/52*    (2006.01)
(52) U.S. Cl. ........... 342/93; 342/159; 342/161; 342/162
(58) Field of Classification Search .................... 342/93, 342/159–162
See application file for complete search history.

(56) References Cited

U.S. PATENT DOCUMENTS 3,707,718 A * 12/1972 Ames ............................. 342/100
3,737,900 A *  6/1973 Vehrs, Jr. ...................... 342/102
3,787,850 A *  1/1974 Sletten et al. ................. 342/161
4,137,532 A *  1/1979 Taylor et al. .................... 342/93
4,318,099 A *  3/1982 Hsiao ............................. 342/160

(Continued)

FOREIGN PATENT DOCUMENTS

| DE | 33 32 614 A1 | 3/1985 |
| DE | 40 17 849 A1 | 12/1991 |
| FR | 2 683 913 A1 | 5/1993 |
| WO | WO 98/22834 | 5/1998 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued in corresponding International Application No. PCT/GB2008/050663 dated Mar. 11, 2010.

(Continued)

*Primary Examiner* — John Sotomayor
(74) *Attorney, Agent, or Firm* — Buchanan Ingersoll & Rooney PC

(57) ABSTRACT

Described herein is a method of preventing false detections in sensors pulse-Doppler radar mounted on a moving platform. The method comprises filtering each received burst using Doppler filtering to split each received burst into at least a fast channel and one or more slow channels. The slow channel outputs are then used to derive compensation values for the fast channel. In particular, a zero Doppler slow channel is used to derive predicted surface clutter residue information, and a near zero Doppler slow channel is used to derive additional false alarm control attenuation information. Both the predicted surface clutter residue and the false alarm control attenuation information is used to apply compensation to the fast channel and a comparison is done to select the lower of the two values to generate an output signal.

10 Claims, 2 Drawing Sheets

U.S. PATENT DOCUMENTS

Figure 1:
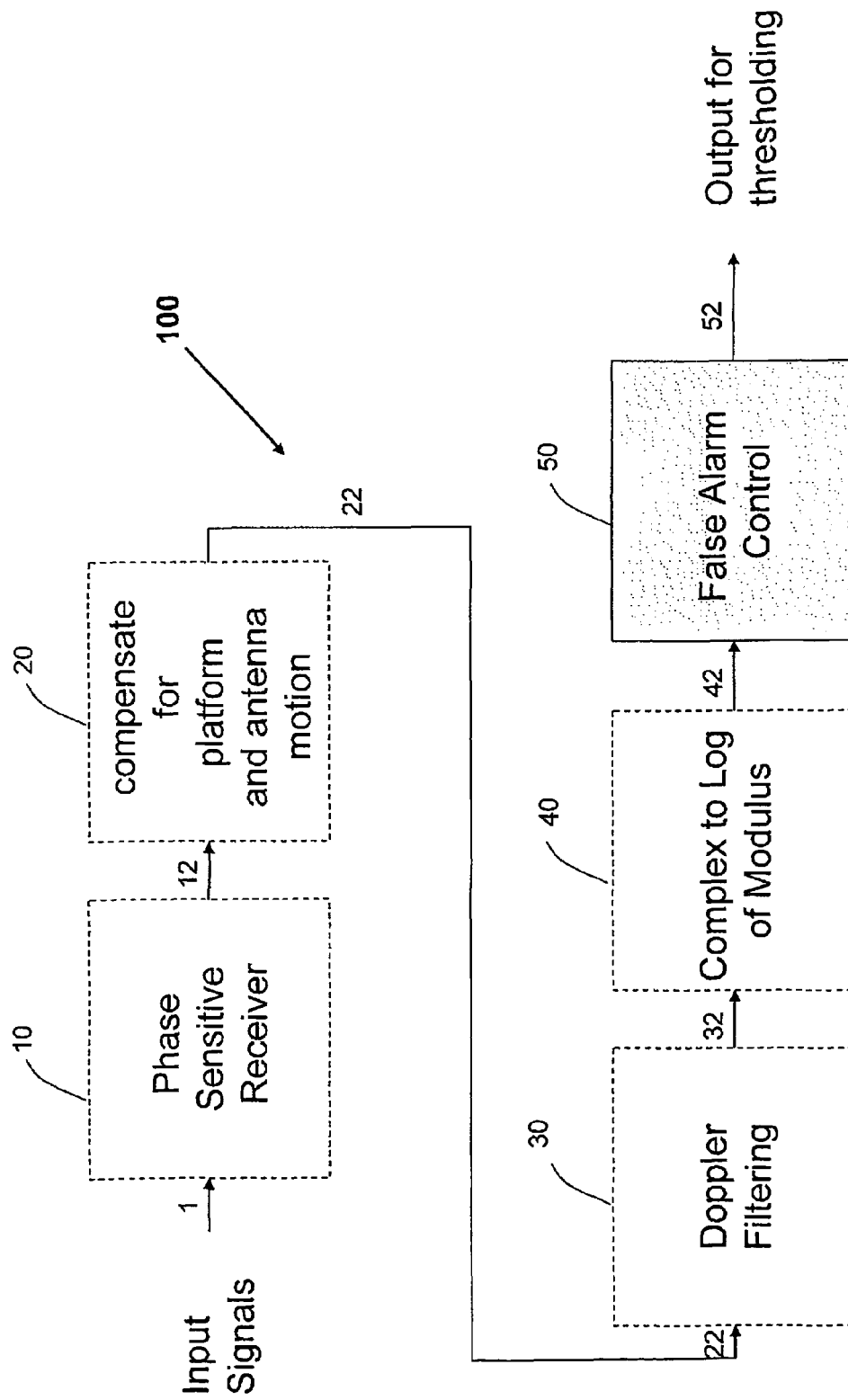

| | | | | |
|---|---|---|---|---|
| 4,400,700 A | * | 8/1983 | Rittenbach | 342/100 |
| 4,459,592 A | * | 7/1984 | Long | 342/93 |
| 4,713,664 A | | 12/1987 | Taylor, Jr. | |
| 5,173,706 A | * | 12/1992 | Urkowitz | 342/99 |
| 5,481,270 A | * | 1/1996 | Urkowitz et al. | 342/101 |
| 5,644,315 A | | 7/1997 | Long | |
| 6,674,397 B2 | * | 1/2004 | Hager et al. | 342/159 |
| 6,894,640 B1 | * | 5/2005 | Hager et al. | 342/120 |
| 7,924,218 B2 | * | 4/2011 | Siegel | 342/159 |
| 7,969,344 B1 | * | 6/2011 | Mahafza | 342/13 |
| 8,013,782 B2 | * | 9/2011 | Våland et al. | 342/159 |
| 8,014,787 B2 | * | 9/2011 | Kruys et al. | 455/454 |

OTHER PUBLICATIONS

United Kingdom Search Report dated Mar. 19, 2008.

Myers et al., "Processing Techniques for Surface Surveillance Radars in Littoral Environments" IEEE International Radar Conference, 1995, pp. 33-38, XP000529109.

The International Search Report and the Written Opinion of the International Searching Authority, or the Declaration in corresponding International Application No. PCT/GB2008/050663 dated Nov. 11, 2008, (Form PCT/ISA/220, PCT/ISA/210 and PCT/ISA/237).

* cited by examiner

METHOD OF PREVENTING FALSE DETECTIONS IN SENSORS

The present invention relates to a method of preventing false detections in sensors.

Various methods exist to control false alarms in radars and other sensors. These include thresholding, Doppler filtering, background averaging and "clutter" maps. However, these methods have limitations when used individually and most radar systems utilise a combination of these methods.

Nevertheless, these are of limited use in regulating false detections from high frequency images of strong returns from background environment. This is particularly the case in sensors mounted on a moving platform. These false detections tend to be principally generated by system instabilities that may interact with "clutter" from the background environment. (The term "clutter" refers to unwanted signals.)

When thresholding is used as the sole method of false alarm control, the threshold can be crossed by strong signals from the background environment.

Whilst Doppler filtering is generally good at removing the bulk of the clutter signals as these signals occur at relatively low frequencies, it is powerless to discriminate between the high frequency components of the "clutter" and targets with high frequency returns that the sensor is designed to detect.

Background averaging estimates the background level for each detection "cell" by averaging the signals in nearby cells. This average is then used to adaptively determine the level of the detection threshold in the cell under test. Usually, the threshold is set to be this estimated background level plus a fixed offset, although some modern constant false alarm rate (CFAR) algorithms also analyse the statistics of the signals in the nearby cells and use this analysis to modify the threshold value. Whilst this technique is very good at removing "clutter" that is distributed across multiple detection cells, it is poor at suppressing false alarms from highly localised "clutter" (such as buildings, rock faces, oil rigs etc).

A "clutter" map can be used successfully to suppress false alarms from highly localised "clutter" when the sensor is stationary. The "clutter" map works by building up a map of the strength of signals received over a long timeframe, typically over many minutes, and setting the detection threshold for a detection cell at the map value plus a fixed offset.

However on a moving platform the background will change from observation to observation, so this option is usually not suitable for use with a sensor mounted on a moving platform, for example, in a pulse-Doppler radar system carried by a ship or aircraft.

In accordance with one aspect of the present invention, there is provided a method of preventing false detections in sensors, the method comprising the steps of:

a) receiving a burst of input signals at a sensor;

b) filtering the received burst into at least two bands in accordance with frequency using a series of Doppler filters; and c) processing a first filtered band in accordance with at least one of the other filtered bands to compensate for predicted events and attenuations.

In accordance with the present invention, step b) comprises splitting each burst into at least a fast channel and a slow channel, and step c) comprises using slow channel outputs to derive compensation values for the fast channel.

Step b) may comprise splitting out a first slow channel using filters at zero Doppler, and c) comprises calculating predicted events based on the first slow channel, and using the calculated predicted events to provide a first compensated fast channel. Step b) may also comprise splitting out a second slow channel using filters not centred at zero Doppler, and step c) comprises calculating attenuations based on the second slow channel, and using the calculated attenuations to provide a second compensated fast channel.

In the case where both a first and a second slow channel is split out, the method further comprises the step of:

d) comparing the first and second compensated fast channels to provide an output comprising the lower of the first and second compensated fast channels.

Ideally, compensation is applied to each filter within said first filtered band.

Figure 2:
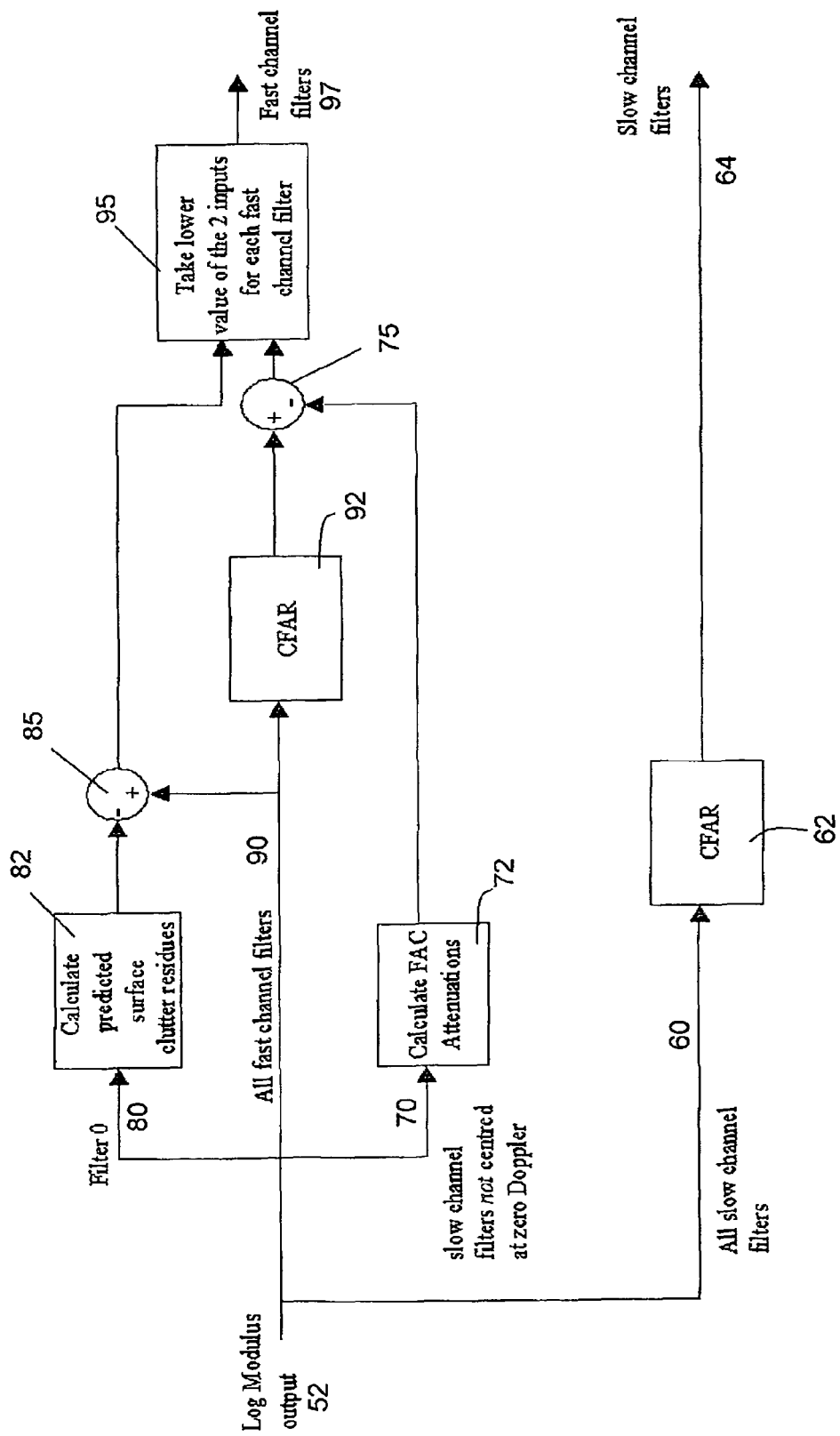

For a better understanding of the present invention, reference will now be made, by way of example, to the accompanying drawings, in which:

FIG. 1 is a block diagram of a signal processor of a sensor in a radar system; and FIG. 2 is a block diagram of a false alarm control system in accordance with the present invention.

Generally, the present invention lies in regulating false detections from detection or tracking sensors caused by the high frequency component of strong returns from the background environment. It is assumed that signals received by such sensors may be filtered by frequency into a number of bands by a series of Doppler filters. As such, the present invention is suitable for use within signal processors of pulse-Doppler radar systems mounted on moving platforms, such as ships or aircraft.

It is to be noted, however, that the present invention is not limited to use in pulse-Doppler radar systems, where the number of frequency bands tends to be large, but can equally be used in a radar system where the number of frequency bands is considerably lower. For example, the number of frequency bands may be as low as two (with high-pass and low-pass filtering) and therefore the present invention can be utilised in a radar system with moving target indication (MTI) processing.

It is assumed that, before Doppler filtering, the input signals are phase rotated to compensate for platform and antenna motion so that the returns from a non-fluctuating target that is stationary with respect to the earth's surface are presented to Doppler filters with the same phase on each pulse of a coherent "burst" of pulses.

Normally, except in exceptional extreme weather conditions, "clutter", (i.e. unwanted echoes from the environment) such as echoes from the earth's surface or weather precipitation, will be contained within a small number of the Doppler filters in the radar system with pass bands at or near zero-Doppler (referred to below as the "slow" filters).

However, it is a fact that these echoes can be so strong that instabilities within the transmit/receive chains of the radar system result in images of the "clutter" appearing in Doppler filters other than those in which the pass band of the true Doppler extent of the "clutter" falls. If the "clutter" changes significantly from range resolution cell to range resolution cell, then this could result in false indications or plots being generated of fast targets.

The way that this problem is often dealt with in radar systems at fixed stationary sites is to build up a map over time of the "clutter", but in a radar system mounted on a moving platform, this method is not straightforward and subject to time restrictions due to the platform motion.

In accordance with the present invention, a snapshot of the stationary "clutter" power contained in the Doppler filter centred at zero Doppler is taken for each coherent burst of pulses, and a priori knowledge of the stability of the radar system is used to estimate the level of breakthrough for each resolution cell and each "fast" (that is, not "slow") Doppler filter. If this estimate is greater than the "background average" level calculated by the CFAR algorithms of the radar system, then the signal output by the CFAR is attenuated by the difference.

In addition the strength of signals in the "slow" Doppler filters other than the zero Doppler filter are compared with a threshold in order to identify "clutter" centred at zero Doppler with a significant Doppler spread, or "clutter" with a significant Doppler shift. In the presence of such "clutter", the estimate of breakthrough will be too low. In the event that such "clutter" is identified, a further attenuation is made to the signal output by the CFAR algorithms.

Referring now to FIG. 1, a part of a signal processing system 100 for a sensor in a pulse-Doppler radar system is shown that receives input signals and outputs signals ready for thresholding. The signal processing system 100 comprises a phase-sensitive receiver unit 10, a motion compensation unit 20, a Doppler filtering unit 30, a 'complex to log of modulus' unit 40 and a false alarm control unit 50.

Received pulsed signals 1 are input to the phase-sensitive unit 10 where they are 'down-mixed' to form digitised, complex, base band signals 12 comprising 'real' and 'imaginary' components known as I and Q respectively.

The digitised base band signal components 12 are then passed to the motion compensation unit 20 where they are processed to compensate for platform and antenna motion. The I and Q components 12 are phase rotated to form motion-compensated components 22. This is so that the returns from a non-fluctuating target (not shown) that is stationary with respect to the surface of the earth have the same phase on each pulse of a coherent 'burst' of pulses.

The motion-compensated components 22 are then passed to the Doppler filtering unit 30 where they are filtered by frequency into a number of bands by a series of Doppler filters (not shown) to form filtered components 32.

The number of bands must be at least two, but in most pulse-Doppler radar systems, the number of bands exceeds four.

After filtering, the components 32 are converted to log modulus values 42 using the equation:

$$\text{Log mod} = \alpha \cdot \log_\beta (I^2 + Q^2)$$

where $\alpha$ and $\beta$ are constants chosen to be consistent with the rest of the signal processor (not shown) and do not affect the operation of the present invention. If the signal processor to which this invention is to be added does not include any of these components, they must be added. The values 42 include log modulus values for each Doppler filter channel.

The values 42 are then passed to the false alarm control unit 50 where they are modified to provide output signals 52 that they can be compared with a fixed or constant threshold value for detection.

The Doppler filter outputs for each 'burst' of coherent signals are split into two sets or "channels", namely, a slow channel and a fast channel. Normally, except in exceptional extreme weather conditions, unwanted echoes or "clutter" from the environment such as the surface of the earth or weather precipitation will be contained within a small number of the Doppler filters. In particular, the "clutter" will be contained within Doppler filters with pass bands at or near zero Doppler. The filters with such pass bands are chosen for the slow channel. The fast channel will contain all the other filters.

For each slow channel filter, the false alarms are controlled using only a standard CFAR algorithm.

For each fast channel filter and each range cell, two different estimates of the "clutter" background are generated. The greatest of these is subtracted (in the log domain) from the signal in the test cell.

The first estimate is calculated using the signal strength in the same range cell from the Doppler filter centred at (or nearest to) zero Doppler (referred to below as Doppler filter 0). It is an estimate of surface "clutter" residues (and may well fall below the noise level).

The second is an estimate of the background in the range cells around the test cell in the fast channel filter. This is based on the background estimated using a standard CFAR algorithm or background averaging technique that estimates the background level for each detection "cell" by simply averaging the signals in nearby cells.

However, in accordance with the present invention, this estimate is modified to control false alarms in the presence of fast moving "clutter", anomalous "clutter", or "clutter" with strange spectral characteristics, by adding an offset to the background (in the log domain) based on the strength of the signals in those slow channel filters not centred at zero Doppler. (This offset is referred to as the false alarm control (FAC) attenuation). The false alarm control unit 50 is shown in more detail in FIG. 2.

In FIG. 2, the false alarm control unit 50 directs the log modulus output signals 42 into various channels in accordance with the Doppler filter outputs, namely, a slow channel 60 with filters centred near zero Doppler, a slow channel 70 with filters not at zero Doppler, a zero Doppler channel 80 with filters at zero Doppler, and a fast channel 90 with filters for all the other channels. Slow channel 60 comprises all the filters from slow channel 70 and slow channel 80.

In slow channel 60, the signals are processed using standard CFAR algorithms (block 62) only to produce output signals 64 indicative of the slow channel filters.

The signals in the zero Doppler channel 80 (Doppler filter 0) are used to calculate predicted surface "clutter residues" (block 82). The output from block 82 is passed to a summer 85 for subtracting from the signals in the fast channel 90 to provide an input to a comparator 95.

The signals in fast channel 90 are processed using CFAR algorithms (block 92) to provide an input to summer 75.

The signals in slow channel 70 are used to calculate FAC attenuations (block 72) and the output from block 72 is used as the second input to summer 75. Summer 75 subtracts the output from block 72 from the output from block 92 to provide a further input to the comparator 95.

Comparator 95 takes the lower of the two inputs, from summer 85 and summer 75 respectively, to provide output signals 97 indicative of the fast channel filters.

The predicted surface "clutter" residues are calculated in block 82 as follows. For each range cell, using the log modulus value of Doppler filter 0, a set of predicted (worst case) "clutter" residues values is calculated (one for each Pulse Doppler fast channel filter), using the following equation:

$$\text{residue}_k = \text{Signal}_0 - \text{imp}_k \quad \text{if } \text{Signal}_0 > \text{imp}_k$$
$$= 0 \quad \text{otherwise}$$

where k is the fast channel filter number;
$\text{Signal}_0$ is the log modulus of the signal amplitude in filter 0; and
$\text{imp}_k$ is the logarithm (derived assuming the same $\alpha$ and $\beta$ as above) of the (worst case) surface "clutter" improvement factor in filter k (that is, the expected level of high frequency signals at the receiver output with respect to the low frequency signals from a clutter source).

The FAC attenuations are calculated in block 72 by, for each range cell, finding the largest log modulus in those slow channel filters not centred at zero Doppler in the burst and comparing that value to a range-invariant threshold. If the threshold is exceeded, a set of attenuation values (one for each fast channel filter in the burst) is calculated by using the excess (log modulus minus threshold) multiplied by a scaling factor to index a set of tables of attenuation values. If the threshold is not exceeded, all attenuations in the set for the burst are zero.

There is a separate attenuation table for each slow channel filter, where the filters are not centred at zero Doppler, and each fast channel filter combination. The slow channel filter used in choosing the attenuation table is the (non zero-Doppler) filter containing the largest value. The choice of slow channel filters is immaterial in cases where the largest value occurs in more than one filter.

The attenuations calculated in block 72 are applied to the log modulus data after CFAR in the fast channel 90. The attenuation is subtracted from the CFAR output. There is a separate attenuation for each range cell and each filter.

After applying the false alarm control attenuations in the pulse-Doppler fast channel filters, the resulting value is compared to the difference between the CFAR input and the predicted surface clutter residue. The lower value is chosen as the post-false alarm control log output 97.

Suppose that cfar_input(k) corresponds to the signals on channel 90 that is, the input to CFAR 92), residue$_k$ corresponds to the output of summer 85 (that is, the predicted surface "clutter" residues), cfar_output(k) corresponds to the output of CFAR 92, fac_atten(k) corresponds to the output of block 72 (that is, the false alarm control attenuation), and fac_output(k) corresponds to the output from comparator 95 (that is, the resulting output from the low-loss false alarm control unit 50), then, all for fast channel filter number k in one range cell and burst, then:

$$\text{fac\_output}(k) = \text{MIN}((\text{cfar\_output}(k) - \text{fac\_atten}(k)), (\text{cfar\_input}(k) - \text{residue}_k))$$

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of preventing false detections in sensors, the method comprising the steps of:
   a) receiving a burst of input signals at a sensor;
   b) filtering the received burst into at least two bands in accordance with frequency using a series of Doppler filters; and
   c) processing a first filtered band in accordance with at least one of the other filtered bands to compensate for predicted events and attenuations.

2. A method according to claim 1, wherein step b) comprises splitting each burst into at least a fast channel and a slow channel, and step c) comprises using slow channel outputs to derive compensation values for the fast channel.

3. A method according to claim 2, wherein step b) comprises splitting out a first slow channel using filters at zero Doppler, and c) comprises calculating predicted events based on the first slow channel, and using the calculated predicted events to provide a first compensated fast channel.

4. A method according to claim 3, wherein step b) comprises splitting out a second slow channel using filters not centred at zero Doppler, and step c) comprises calculating attenuations based on the second slow channel, and using the calculated attenuations to provide a second compensated fast channel.

5. A method according to claim 4, further comprising the step of:
   d) comparing the first and second compensated fast channels to provide an output comprising the lower of the first and second compensated fast channels.

6. A method according to claim 1, wherein compensation is applied to each filter within said first filtered band.

7. A method according to claim 2, wherein compensation is applied to each filter within said first filtered band.

8. A method according to claim 3, wherein compensation is applied to each filter within said first filtered band.

9. A method according to claim 4, wherein compensation is applied to each filter within said first filtered band.

10. A method according to claim 5, wherein compensation is applied to each filter within said first filtered band.

* * * * *